Jan. 31, 1928.
C. A. BODDIE
1,657,492
REGULATOR SYSTEM
Filed Nov. 26, 1924
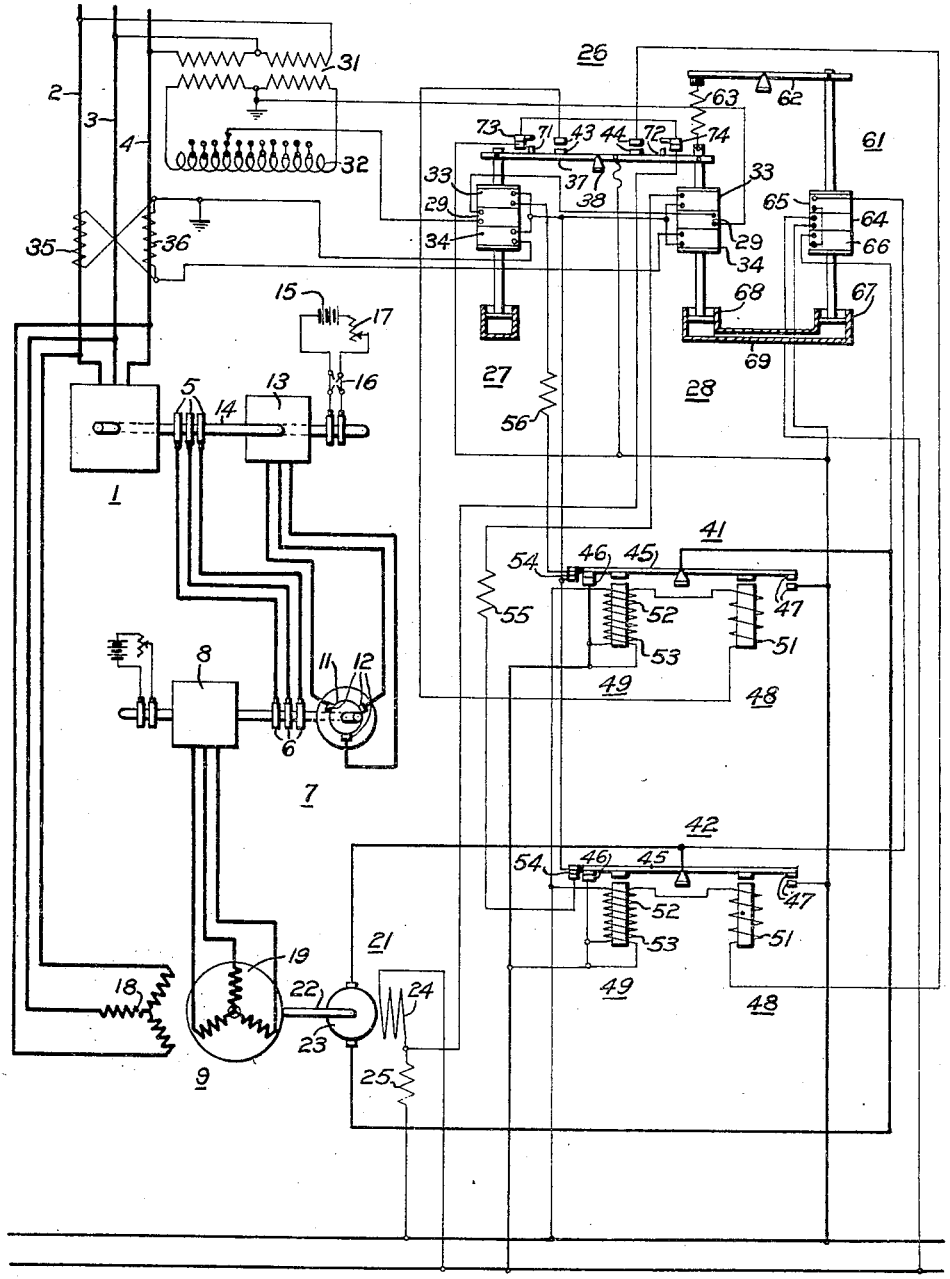
WITNESSES:
INVENTOR
Clarence A. Boddie.
BY
ATTORNEY Patented Jan. 31, 1928.

1,657,492

UNITED STATES PATENT OFFICE.

CLARENCE A. BODDIE, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed November 26, 1924. Serial No. 752,360.

My invention relates to regulator systems and it has special relation to a regulator actuated in accordance with a predetermined power factor of a supply circuit.

One object of my invention is to provide a power-factor regulator which will be positive and quick-acting in its operation and sensitive to slight changes in circuit conditions.

Another object of my invention is to provide a regulator of the above-indicated character which shall embody a control magnet and a plurality of anti-hunting means. My invention has special application to variable-speed induction-motor sets of the character disclosed and claimed in an application by C. W. Kincaid, Serial No. 543,819, filed March 15th, 1922, and assigned to the Westinghouse Electric & Manufacturing Company.

An induction-motor variable-speed set of the character referred to, consists essentially of a main induction motor having a wound secondary structure, a synchronous machine mechanically coupled to the induction motor, and a synchronously driven frequency converter of the commutator type, for converting the slip frequency currents of the secondary winding to the currents of line frequency, minus slip frequency in said synchronous machine. By the adjustment of the excitation of the synchronous machine in magnitude and direction, the speed may be controlled for operation both under and over synchronous speed.

Connected in the supply circuit for the main induction motor is a power-factor regulator which comprises a pair of watt or power factor relay magnets adapted to assist each other in controlling the operation of a pilot motor connected to govern an induction regulator in the supply circuit of the synchronous motor. One coil of each control magnet has a resistor connected in parallel-circuit relation therewith. One of these circuits is opened, upon the operation of the regulator, to change the energization of the magnets, for the purpose of preventing hunting action of the control magnets. A second anti-hunting means is directly associated with one of the control magnets and comprises a magnet energized in accordance with the operation of the pilot control motor. A dash-pot connection is provided between this anti-hunting magnet and one of the control magnets. This connection causes the operation of the anti-hunting magnet to temporarily change the setting of the control magnet.

Reference may now be had to the accompanying drawing, in which the single figure is a diagrammatic view of the system and apparatus embodying my invention.

An induction motor 1 is adapted to be supplied through conductors 2, 3 and 4 of a three-phase power circuit. The rotor of the induction motor 1 is connected to slip-rings 5, which are in turn connected to slip-rings 6 in the rotor circuit of a frequency changer 7. The frequency changer is driven by a synchronous motor 8 supplied with energy from the circuit 2—3—4, through an induction regulator 9.

The rotor of the frequency changer 7 has a commutator 11 from which brushes 12 supply energy from the frequency changer to the stator winding of a synchronous motor 13 mounted upon a shaft 14 of the driving motor 1. The rotor or field winding of the motor 13 is energized from any suitable direct-current source 15 through the reversing switches 16, and an adjustable rheostat 17.

During the under-synchronous operation of the set, the slip-frequency currents generated in the secondary winding of the main motor are transformed through the synchronous-running frequency changer 7 into currents having line frequency minus slip frequency. This power is supplied to the synchronous machine 8 to drive the same as a motor, assisting the main motor 1 in supplying torque to the shaft 14.

The electromotive force of the currents generated in the induction motor secondary windings are proportional to the slip of the induction motor and, therefore, the speed may be regulated by adjusting the electromotive force developed by the synchronous machine 8. When this electromotive force is reduced to zero, the set runs at a speed somewhat below synchronous speed. By reversing the excitation of the synchronous machine 13 and supplying a small field current in the reverse direction, the speed of the set may be brought to synchronous speed, and by still further increasing the field, over-synchronous speeds may be obtained within the range of the set.

During over-synchronous operation, the synchronous machine 13 operates as a generator of currents having a frequency equal to the line frequency minus slip frequency. The currents generated in the synchronous machine 13 are converted in the frequency converter 7 to slip frequency currents which are fed to the secondary windings of the main motor 1 to drive it as a double-fed motor.

It has been found that by properly choosing the power-factor of the supply circuit, a speed torque characteristic of the set may be obtained which approximates the desirable conditions for all speeds and loads. It is, therefore, possible to maintain the proper speed of the set for steel mill drives and for similar heavy service by controlling the power-factor of the supply circuit without utilizing additional speed responsive means.

The induction regulator 9 is provided with a stator winding 18 connected to the supply circuit 2—3—4, and a rotor winding 19 connected to the synchronous motor 8 and adapted to be driven by a pilot motor 21 and shaft 22. The motor 21 is provided with an armature 23 and a field winding 24. A resistor 25 is provided in circuit with the field winding 24 and may be controlled to increase the speed of the pilot motor, as hereinafter described. The pilot motor 21 is controlled by a regulator 26 comprising control magnets 27 and 28.

Each of the control magnets has centrally disposed thereupon voltage coils 29 which are energized from the potential transformer 31 connected across the supply conductors 2, 3 and 4 through an adjusting auto-transformer 32. Disposed on opposite sides of each of the voltage coils 29 are differentially-wound current coils 33 and 34 which are adapted to be energized from series transformers 35 and 36 connected respectively to supply conductors 2 and 4. The control magnets 27 and 28 are connected to a lever 37 on opposite sides of a pivot 38. The coils of the respective magnets are wound so as to have a cumulative control action upon the lever 37.

The lever 37 selectively completes the circuit to switch mechanisms 41 and 42 through contact members 43 and 44. The switch members 41 and 42 respectively control the operation of the pilot motor 21 in one direction or the other and comprising a pivoted lever 45 having at the respective ends thereof contact members 46 and 47. The lever 45 has cooperating therewith electromagnets 48 and 49 located on opposite sides of the pivot thereof. The electromagnet 48 has an energizing coil 51 and electromagnet 49 comprises coil 52 which is connected in series relation with the coil 51 and is energized simultaneously therewith, and a coil 53 differentially wound with respect to coil 52 and permanently energized.

Accordingly, when a circuit is completed through either of the contact members 43 or 44, the coils 51 and 52 are energized. Coil 52 neutralizes the effect of coil 53 and thereby releases the lever 45 to be actuated by the coil 51 of the electromagnet 48, as will be more fully described hereinafter.

Each of the levers 45 controls an interlock switch 54 whenever it is actuated to complete the circuit to the pilot motor 21. Interlock switches 54 control a shunt circuit for resistors 55, 56 in parallel-circuit relation respectively with one of the current coils of each of the control magnets 27 and 28. Accordingly, whenever either the switch 41 or the switch 42 is actuated, one of the resistors 55 or 56 are excluded from the circuit of the windings of the control magnets 27 and 28 to change the setting thereof and to thereby prevent hunting action.

A second anti-hunting device comprises an electromagnet 61 which is mechanically connected to a pivot lever 62 having at the opposite end thereof a spring 63 which yieldingly connects the lever 62 with the control lever 37. The anti-hunting magnet 61 comprises a centrally disposed voltage coil 64 energized from the constant potential source. Disposed on opposite sides of the voltage coil 64 are differentially wound current coils 65 and 66 which are connected in circuit with the armature 23 of the pilot motor 21 and, consequently, are energized in accordance with the operation thereof.

The electromagnet 61 has cooperating therewith a dash-pot 67 hydraulically connected to a dash-pot 68 which cooperates with control magnet 28 through the connecting pipe 69. The magnet 61 is permanently polarized and is actuated in accordance with the direction of current through the coils 65 and 66. The energization of this electromagnet is proportional to the operation of the pilot motor, and will initiate a reactive movement against the piston in the dash-pot 68 connected to the control magnet 28 to move the lever 37 to break the circuit to the pilot motor prior to the obtaining of normal power factor conditions upon the supply circuit 2, 3 and 4.

In the event that large corrective movements of the pilot motor are necessary, and in order to effect the movements prior to the obtaining of dangerous conditions upon the supply circuits 2, 3 and 4, the lever 37 has mounted thereupon studs 71 and 72 respectively controlling contact members 73 and 74 which are in series relation and control a circuit to resistance 25 in the field magnet winding circuit of the pilot motor. In the event of large movements of the lever 38, the studs 71 or 72 will separate contact members 73 or 74 to insert the resistance 25 in circuit with the field-magnet winding 24 of the pilot motor to increase the speed of operation thereof.

The operation of the system above described is as follows, assuming, for example, a leading current in the supply circuit comprising conductors 2, 3 and 4.

The leading current will cause an energization of the electromagnets 27 and 28 to move the lever 38 to engage the contact members 43 and thereby energize coils 51 and 52 of the switch 41 to operate the pilot motor 21 to vary the phase angle of energy supplied to the synchronous machine 8. Simultaneously with the closing of the switch 41, interlock 54 associated therewith will open the circuit to the resistors 55 and 56 which are included in circuit with the energizing coils of control magnets 27 and 28. This action will increase the energization of the coils of control magnets 27 and 28 to restore the lever 37 to its normal central position prior to the obtaining of normal load conditions upon the supply conductors 2, 3 and 4.

Assuming that the leading current is relatively large, the control magnets 27 and 28 will be operated to close the contact members 43 in the manner just described and the further movement of the control lever 38 will cause the stud 72 to separate the contact member 74, thereby inserting the resistance 25 in circuit with the field-magnet winding 24 of the pilot motor 21. This will effect a higher operating speed of the rheostat motor and a faster change in the phase angle between the supply circuit conductors 1, 2 and 3 and the energization of the synchronous motor 8.

With the higher operating speed of a pilot motor 21, a current proportional to the armature current of the motor 21 will energize the coils 65 and 66 to impart movement to the anti-hunting magnet 61. The core armature of this magnet will actuate the lever 62 to increase the pull of the spring 63 upon the lever 37. Simultaneously, the piston in the dash-pot 67 will displace the piston in the dash-pot 68 through the hydraulic connection 69 to raise the core armature of control magnet 28 to restore the contact lever 38 to its normal position prior to the obtaining of normal load conditions upon the supply conductors 2, 3 and 4.

What has been said with reference to the operation for a leading current will apply equally, only conversely, to the corrective operation in the event of a lagging current.

The above-described operation will apply irrespective of the power factor being maintained. That is, the apparatus may be said to maintain unity power factor or any predetermined power factor depending upon the adjustment of the auto-transformer 32.

Modifications in the arrangement and location of parts may be made within the spirit and scope of my invention, and I do not wish to be limited other than by the appended claims.

I claim as my invention:

1. In a regulator system, the combination with a supply circuit, of means for controlling the power-factor thereof, a motor for operating said means provided with an armature winding and a field winding, means for energizing said motor comprising a power-factor relay energized in accordance with the power-factor of said circuit, anti-hunting means actuated in accordance with the energization of said motor, a resistor, and means responsive to an extreme position of said relay for inserting said resistor in circuit with said motor field winding for increasing the motor speed.

2. In a regulator system, the combination with a supply circuit, of means for controlling the power-factor thereof, a motor for operating said means, means for energizing said motor comprising a pair of electromagnets each provided with a central voltage coil and two differentially related current coils, resistor means normally connected in parallel-circuit relation with certain of said current coils, means actuated in accordance with the operation of said magnets for interrupting the circuits of said resistor means.

3. In a regulator system, the combination with a supply circuit, of means for controlling the power-factor thereof, a motor for operating said means, means for energizing said motor comprising a pair of electromagnets each provided with a central voltage coil and two differentially-related current coils, resistor means normally connected in parallel circuit relation with certain of said current coils, means actuated in accordance with the operation of said magnets for interrupting the circuits of said resistor means, and anti-hunting means actuated in accordance with the energization of said motor.

4. In a regulator system, the combination with a suppy circuit, of means for controlling the power-factor thereof, electroresponsive means for operating said first-named means, and regulator means for said electroresponsive means, said regulator means comprising a power-factor relay, anti-hunting means actuated in accordance with the operation of said relay for varying energization thereof, and anti-hunting means actuated in accordance with the energization of said electrorsponsive means and operable to react upon the power-factor relay.

In testimony whereof I have hereunto subscribed my name this 20th day of November 1924.

CLARENCE A. BODDIE.